United States Patent [19]
Lee

[11] Patent Number: 6,091,442
[45] Date of Patent: Jul. 18, 2000

[54] APPARATUS FOR IMPROVING THE VISIBILITY OF IMAGES

[75] Inventor: Chang-Hyeon Lee, Suwon, Rep. of Korea

[73] Assignee: Samsung Electronics Co., Ltd., Kyungki-do, Rep. of Korea

[21] Appl. No.: 08/799,932

[22] Filed: Feb. 13, 1997

[30] Foreign Application Priority Data

Feb. 21, 1996 [KR] Rep. of Korea .......................... 96-4078

[51] Int. Cl.⁷ .................................................. H04N 5/14
[52] U.S. Cl. .............................................. 348/28; 348/671
[58] Field of Search .................................. 358/168, 169, 358/166, 465, 447, 455; 348/28, 671, 673, 674, 676, 677, 678, 682, 626; H04N 5/200, 5/202, 5/14

[56] References Cited

U.S. PATENT DOCUMENTS

| | | | |
|---|---|---|---|
| 4,187,519 | 2/1980 | Vitols et al. ............................... | 348/28 |
| 4,276,568 | 6/1981 | Wischer ................................... | 358/464 |
| 5,089,890 | 2/1992 | Takayama ................................ | 348/678 |
| 5,196,937 | 3/1993 | Kageyama ............................... | 348/673 |
| 5,257,108 | 10/1993 | Muraoka .................................. | 348/28 |
| 5,461,430 | 10/1995 | Hagerman ................................ | 348/674 |
| 5,907,665 | 5/1999 | Sobol et al. ............................. | 358/455 |

FOREIGN PATENT DOCUMENTS 61-105975  5/1986  Japan .............................. H04N 5/200

*Primary Examiner*—David E. Harvey
*Attorney, Agent, or Firm*—Sughrue, Mion, Zinn, Macpeak & Seas, PLLC

[57] ABSTRACT

An apparatus for improving the visibility of an image to be displayed is provided in an image signal processor such as a TV or VCR. The image visibility improvement apparatus compares levels of an input image signal with predetermined individual high-level or low-level reference values and outputs the compared result signals. The visibility improvement apparatus increases the level of the image signal if the level of the input image signal is higher than the high-level reference value and decreases the level of the image signal if the input signal is lower than the low-level reference value, according to the results of the comparison. The apparatus thereby further distinguishes the level of the signal of a brighter region from that of a darker region. Thus, the image displayed on a screen can be viewed more easily.

15 Claims, 6 Drawing Sheets

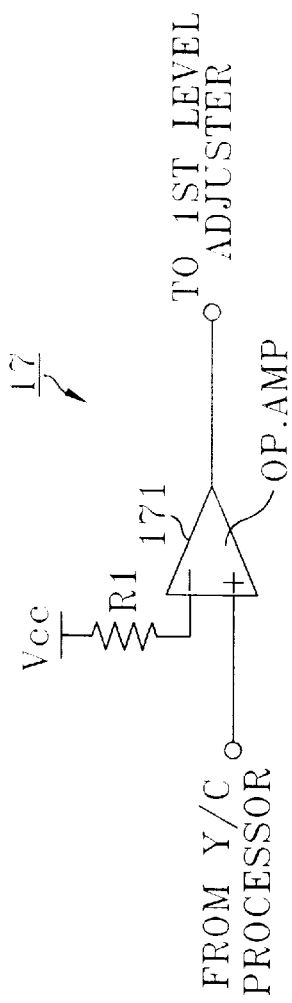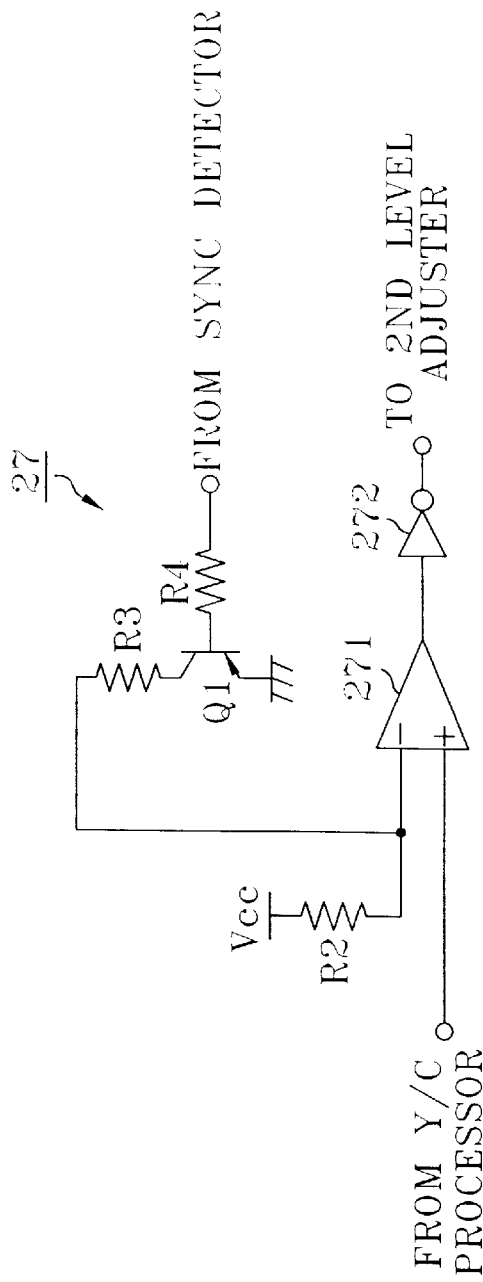

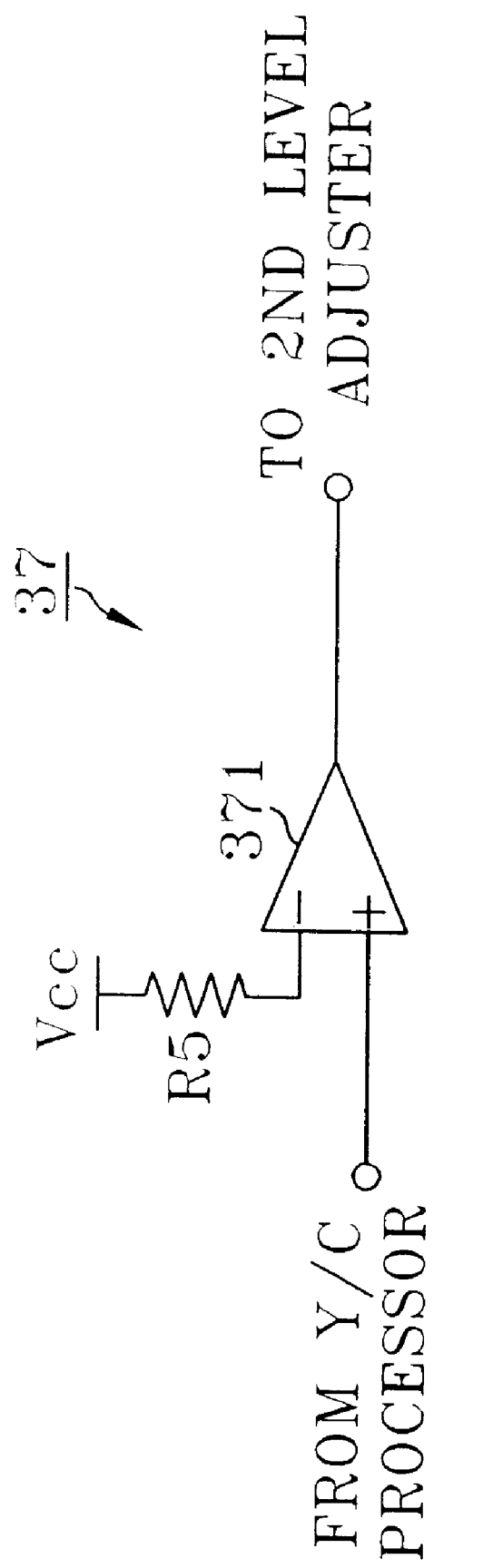

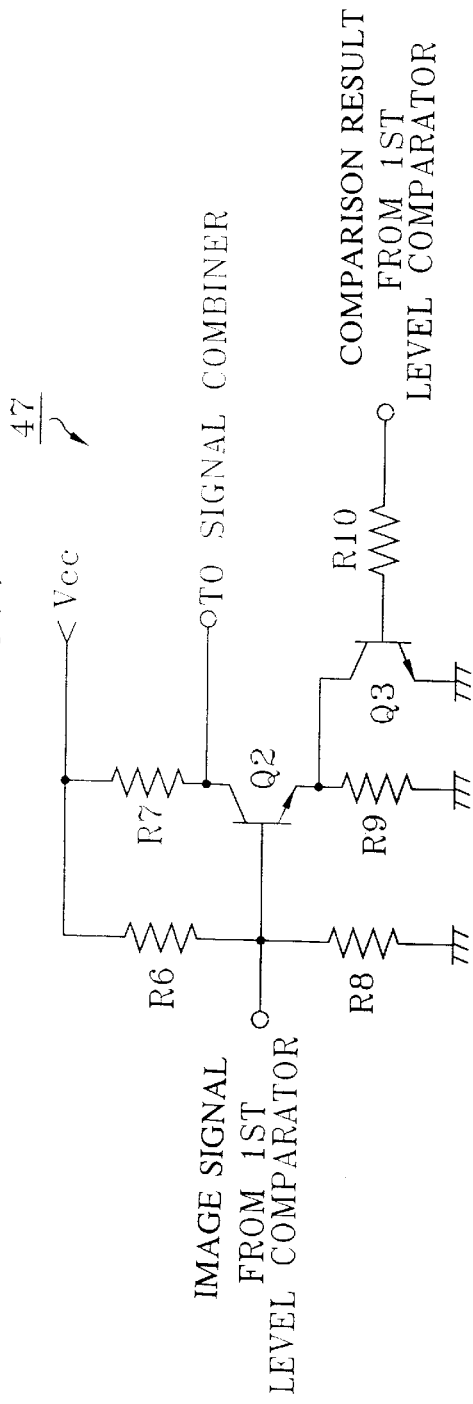
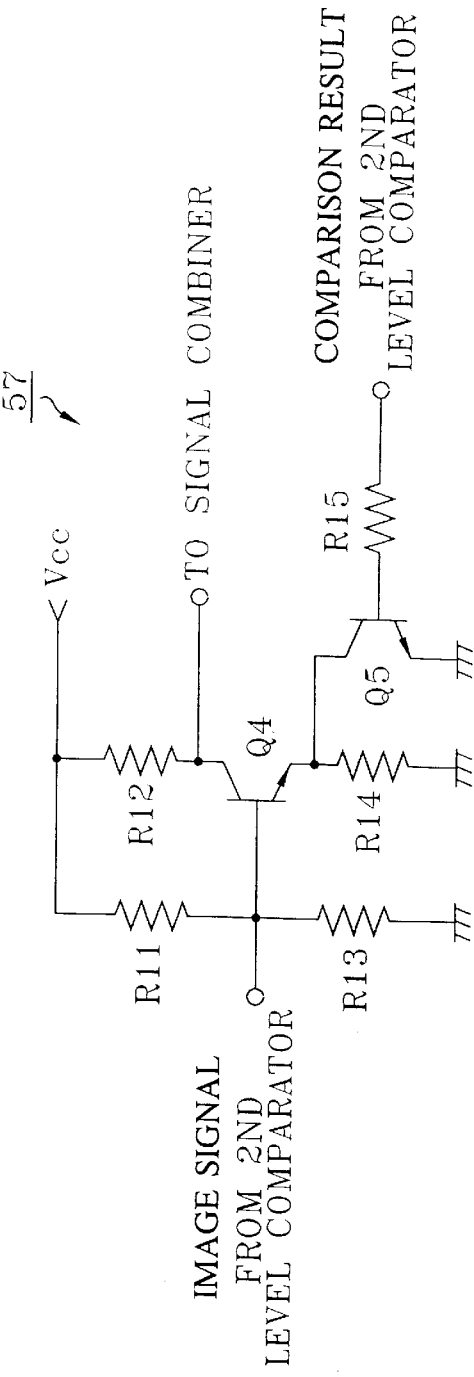

APPARATUS FOR IMPROVING THE VISIBILITY OF IMAGES

BACKGROUND OF THE INVENTION

The present invention relates to an image signal processor for a television (TV) set or a video cassette recorder (VCR), for example. More particularly, the invention relates to an apparatus for improving the visibility of an image to be displayed on a screen by enlarging the difference in signal level between bright and dark image areas.

FIG. 1 shows a general VCR including a mechanism block 1, a servo block 5, a signal processing block 3 and a control block 6.

In FIG. 1, a main controller 6 controls the other blocks so that a corresponding mode operation is performed according to the recording or reproduction mode of a VCR. When the VCR is in a recording mode, a luminance/chrominance (Y/C) processor 3 receives an image signal via an input/output portion 4 and processes the image signal to a signal having a recordable form. A preamplifier 2 connected to the Y/C processor 3 amplifies the input image signal to a predetermined magnitude. A mechanism block 1 is driven by a servo block 5 and records the amplified image signal on a medium such as a magnetic recording tape. The servo block 5 drives the mechanism block 1 under control of the main controller 6. When the VCR is in a reproduction mode, the mechanism block 1 is driven by the servo block 5, reads the image signal recorded on the recording medium, and outputs the read signal to the preamplifier 2. The preamplifier 2 amplifies the image signal output from the mechanism block 1 to a predetermined magnitude. The Y/C processor 3 processes the amplified image signal into a form capable of being displayed, to output the processed signal via the input/output portion 4.

However, an image processed and displayed in the VCR as described above is not easily viewed and thus requires improved visibility.

SUMMARY OF THE INVENTION

To solve the above problem, it is an object of the present invention to provide an image visibility improvement apparatus for enhancing the visibility of an image by further brightening a bright portion of an image signal and further darkening a dark portion of the signal.

To accomplish the above object of the present invention, there is provided an image visibility improvement apparatus comprising:

comparator means for comparing levels of an input image signal with predetermined individual reference levels and outputting signals corresponding to the results of the comparisons; and visibility improvement means for enhancing visibility of an image produced by the input image signal by level-adjusting the input image signal to brighten a bright portion of the image signal and to darken a dark portion of the image signal according to results of said comparator means.

BRIEF DESCRIPTION OF THE DRAWINGS

The preferred embodiments are described with reference to the drawings wherein:

FIGS. 4A and 4B are detailed circuit diagrams showing the level comparators of FIG. 3;

FIG. 5 is a detailed circuit diagram showing the sync detector of FIG. 3;

FIGS. 6A and 6B are detailed circuit diagrams showing the level adjusters of FIG. 3.

DETAILED DESCRIPTION OF THE PREFERRED EMBODIMENT

A preferred embodiment of the present invention will be described in detail with reference to the accompanying drawings.

Figure 1:
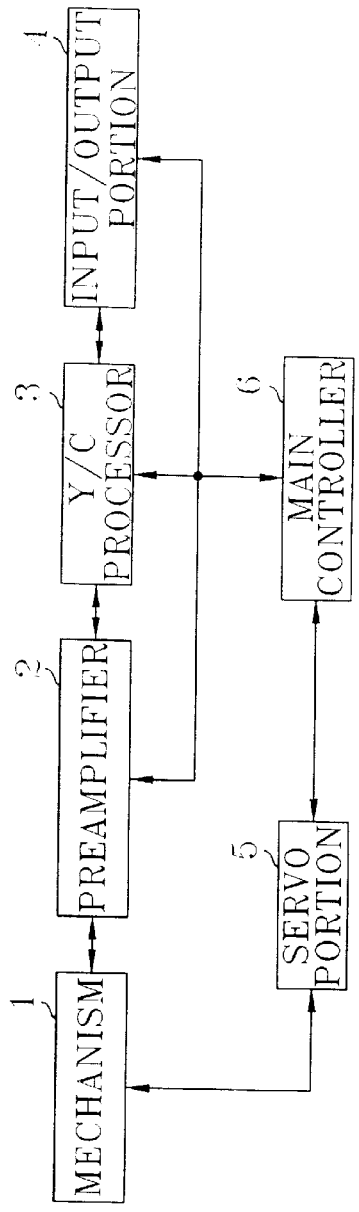
FIG. 1 shows a general VCR.
Figure 2:
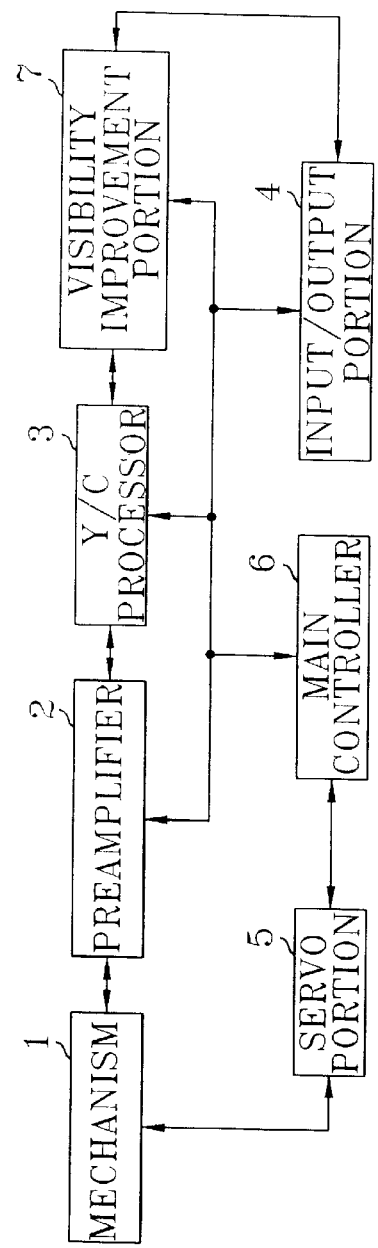
FIG. 2 shows a VCR which includes an embodiment of the present invention.

FIG. 2 illustrates a VCR including the image signal processor of the present invention. Since several components of FIG. 2 perform the same functions as known components of FIG. 1, they are identified by the same reference numerals and the detailed description of these components will be omitted. In the present invention, a visibility improvement portion 7 is connected between the Y/C processor 3 and the input/output portion 4 shown in FIG. 1.

The visibility improvement portion 7 compares the levels of the image signal output from the Y/C processor 3 with predetermined high-level and low-level reference values. The visibility improvement portion further adjusts the level of the input image signal according to the results of these comparisons. Here, the high-level reference value and the low-level reference value correspond to a predetermined level for a bright image signal and a predetermined level for a dark image signal, respectively. If the level of the input image signal received from the Y/C processor 3 is higher than the high-level reference value, the visibility improvement portion 7 adjusts the level of that portion of the received image signal to a signal which has a higher level than the received signal. The amount of the signal level increase over the input signal is predetermined to produce a brighter image output for that portion of the image. If the level of the input image signal received from the Y/C processor 3 is lower than the low-level reference value, the visibility improvement portion 7 adjusts the level of that portion of the received image signal to a signal which has a lower level than the received signal. The amount of the signal level decrease below the input signal level is predetermined to produce a darker image output for that portion of the image. Thus, the visibility improvement portion 7 enlarges the signal level difference between bright portions of a display and dark portions of a display. A detailed block diagram illustrating a visibility improvement portion of FIG. 2 is shown in FIG. 3.

Figure 3:
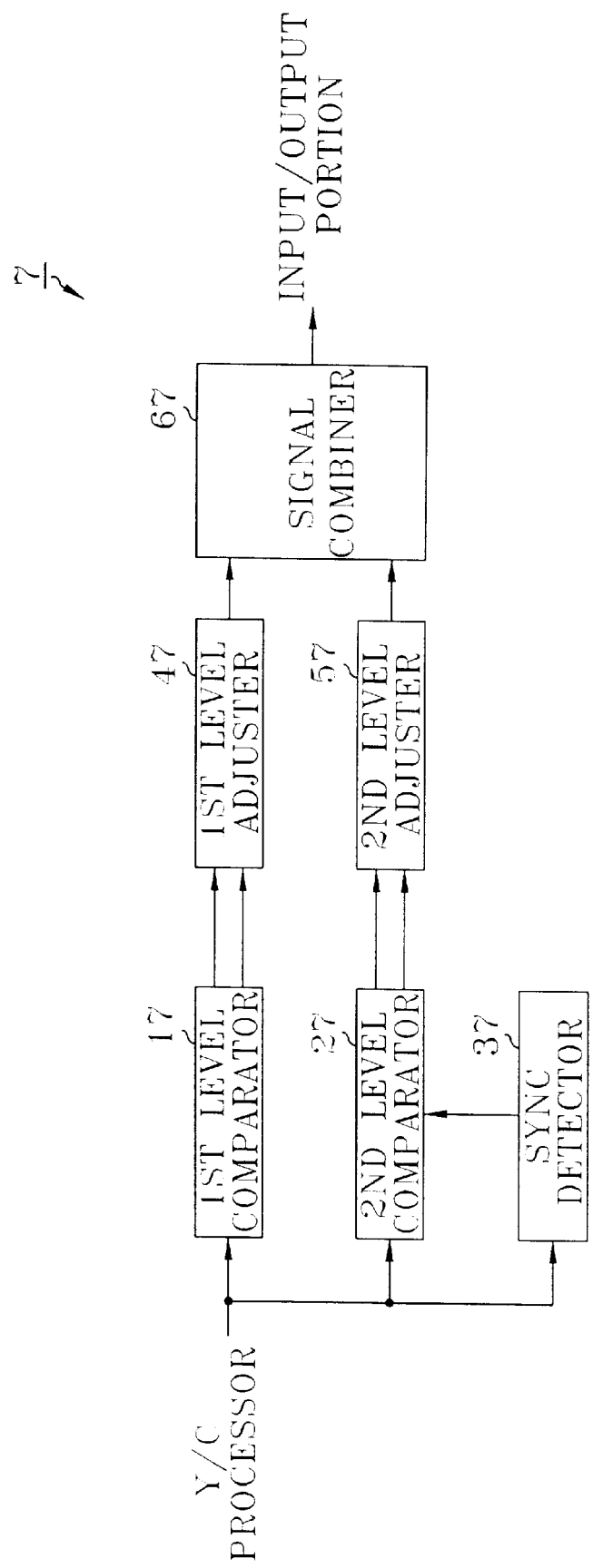
FIG. 3 is a detailed block diagram showing a visibility improvement portion of FIG. 2.

The visibility improvement portion 7 shown in FIG. 3 includes level comparators 17 and 27 for receiving the image signal output from the Y/C processor 3 and for comparing the level of the input image signal with the predetermined high-level reference value and the predetermined low-level reference value. The level comparator 27 is connected to a sync detector 37. The image signal input to the level comparator 27 is also input to the sync detector 37. The sync detector 37 detects a sync interval signal in the input image signal and excludes the sync interval signal of the input image signal from the comparison with a low-level reference signal performed by the level comparator 27. Level adjusters 47 and 57, which are connected to the corresponding level comparators 17 and 27 respectively, receive the input image signals and the comparison results from the level comparators 17 and 27. The level adjuster 47 adjusts the level of the input image signal according to the comparison result, so that a bright portion of the image signal becomes even brighter. The level adjuster 57 adjusts the level of the input image signal according to the comparison result, so that a dark portion of the image signal becomes even darker. A signal combiner 67 receives the outputs of the level adjusters 47 and 57 and combines the bright level-adjusted image signal and the dark level-adjusted image signal to output the combined result to the input/output portion 4. The operation of the visibility improvement portion 7 will be described in more detail with reference to FIGS. 4A through 7F.

Figure 7A:
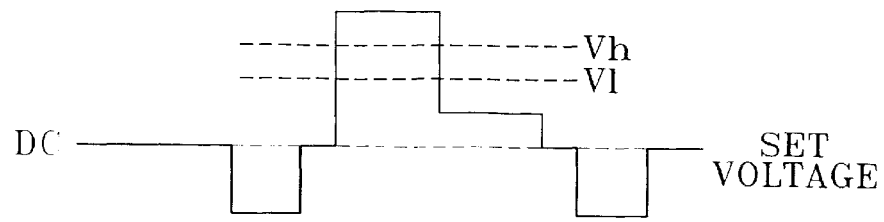
FIGS. 7A through 7F are timing diagrams for explaining the operation of the present invention.
Figure 7B:
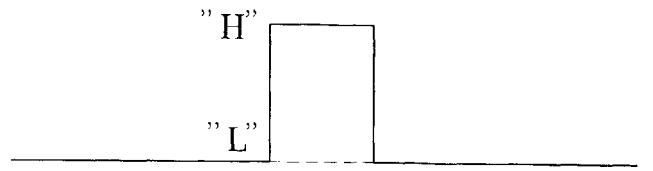
Figure 7C:
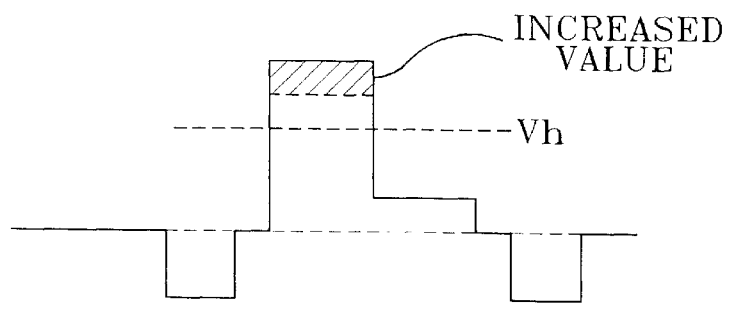

A first level comparator 17 is shown in FIG. 4A and includes an operational amplifier (OP amp) 171 which receives the image signal output from the Y/C processor 3 and compares the level of the received signal with a high-level reference value. The high-level reference value is set by a predetermined voltage Vcc and a resistor R1. Referring to FIG. 7A, if the image signal (the waveform of FIG. 7A) output from the Y/C processor 3 is input to a non-inverting (+) port, the OP amp 171 compares the image signal with the high-level reference value Vh. As shown in FIG. 7B, the OP amp 171 outputs a high-level signal "H" if the level of the image signal is higher than the high-level reference value Vh and outputs a low-level signal "L" if the level of the image signal is lower than the high-level reference value Vh. Here, the output signal of the OP amp 171 is input to the level adjuster 47 shown in FIG. 6A, together with the image signal.

The image signal input to the first level comparator 17 is also input to a second level comparator 27 shown in FIG. 4B. The second level comparator 27 includes an operational amplifier (OP amp) 271 which compares the level of the received signal with a low-level reference value. The low-level reference value is set by a predetermined voltage Vcc and a resistor R2. The output of the OP amp 271 is connected to an inverter 272. The inverting port of the OP amp 271 is connected to the collector electrode of a transistor Q1. The transistor Q1 is turned on or off according to a control signal which is input to the base electrode of the transistor. Here, the control signal is output from the sync detector 37 shown in FIG. 5.

The image signal input to the second level comparator 27 is also input to a sync detector 37 shown in FIG. 5. The sync detector 37 includes an operational amplifier (OP amp) 371 which compares the level of the input image signal with a voltage which is set by a predetermined voltage Vcc and a resistor R5. Here, the set voltage serves as a reference for detecting a sync interval in the input image signal. If the image signal (the waveform of FIG. 7A) is input to a non-inverting (+) port, the OP amp 371 compares the image signal with the set voltage of the DC waveform of FIG. 7A. As a result, the OP amp 371 outputs a low-level signal "L" if the level of the image signal is lower than the set DC voltage and outputs a high-level signal "H" if the level of the image signal is higher than the set DC voltage. Here, the output signal of the OP amp 371 is input to the second level comparator 27 shown in FIG. 4B.

Returning to FIG. 4B, the transistor Q1 is turned off during the time when the control signal input to the base electrode from the sync detector 37 is in the high-level, while the transistor Q1 is turned on during the time when the control signal is in the low-level. The low-level reference value input to the inverting port of the OP amp 271 is varied according to the turned-on or turned-off state of the transistor Q1. The low-level reference value becomes a minute reference value lower than a sync interval level of the image signal when the transistor Q1 is turned on. The low-level reference value becomes a desired reference value (the waveform Vl of FIG. 7A) determined by a predetermined voltage Vcc and a resistor R2 when the transistor Q1 is turned off. If the sync interval signal of the image signal is input to the non-inverting port, the OP amp 271 compares the input sync interval signal with the low-level reference value, to thereby output a high-level signal. The output of the OP amp 271 is inverted by inverter 272 to provide a low level signal. Accordingly, level adjustment with respect to the input signal is not performed during the sync interval within the image signal. If an actual signal which does not correspond to the sync interval signal is input to the non-inverting port, the OP amp 271 compares the image signal with the low-level reference value of the waveform Vl of FIG. 7A, and outputs a high-level signal if the level of the image signal is higher than the low-level reference value, and a low-level signal if the level of the image signal is lower than the low-level reference. The inverter 272 receives the output signal of the OP amp 271 and inverts the received signal.

Figure 7D:
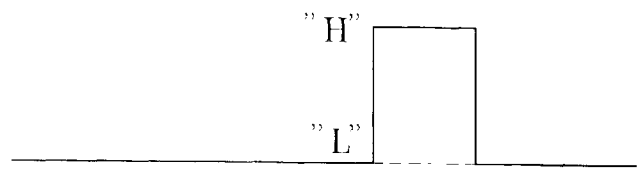
Figure 7E:
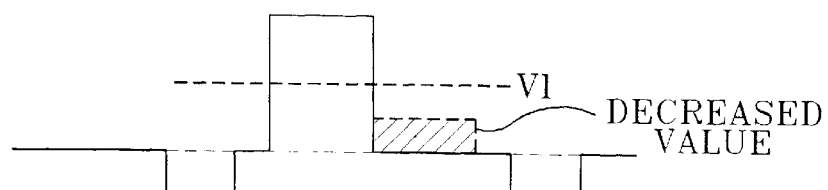
Figure 7F:
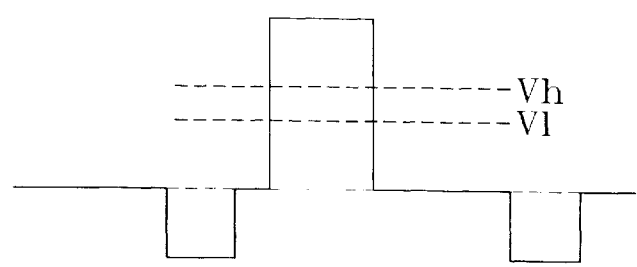

The inverter output for the image signal waveform of FIG. 7A has the waveform shown in FIG. 7D. Here, the output signal is applied to the level adjuster 57 of FIG. 6B, together with the input image signal.

The first level adjuster 47 shown in FIG. 6A includes an NPN-type transistor Q3 which receives the comparison result (the Boslean waveform of FIG. 7B) of the first level comparator 17 via the base electrode of the transistor Q3 and is turned on or off according to the comparison result. The collector electrode of the transistor Q3 is connected to the emitter electrode of a transistor Q2. The transistor Q2 receives the image signal input from the first level comparator 17 via the base electrode thereof, and level-adjusts the level of the input image signal to be higher than a predetermined magnitude according to the on- or off-state of the transistor Q3. When the comparison result signal (the waveform of FIG. 7B) output from the first level comparator 17 is input via the base electrode of the transistor Q3, the transistor Q3 is turned on in the high-level interval of the comparison result signal. By contrast, the transistor Q3 is turned off in the other intervals where the output from the first level comparator is not at a high level. When the image signal is input to the base electrode of the transistor Q2, the transistor Q2 outputs the image signal as it is received during the time when the transistor Q3 is turned off, and outputs the image signal level (the shaded portion of FIG. 7C) which is increased by a predetermined magnitude during the time when the transistor Q3 is turned on. Thus, the level of the image signal is increased by a predetermined magnitude only in the interval where the level of the image signal output from the Y/C processor 3 is higher than the predetermined high-level reference value Vh.

The second level adjuster 57 shown in FIG. 6B includes an NPN-type transistor Q5 which receives the comparison result (the Boslean waveform of FIG. 7D) of the second level comparator 27 via the base electrode of the transistor Q5 and is turned on or off according to the comparison result. The collector electrode of the transistor Q5 is connected to the emitter electrode of a transistor Q4. The transistor Q4 receives the image signal input from the second level comparator 27 via the base electrode thereof, and level-adjusts the level of the input image signal to be lower than a predetermined magnitude according to the onor off-state of the transistor Q5. When the comparison is result signal (the waveform of FIG. 7D) output from the second level comparator 27 is input via the base electrode of the transistor Q5, the transistor Q5 is turned on in the high-level interval of the comparison result signal input to the base thereof, and turned off in the other intervals thereof. If the image signal is input to the base electrode of the transistor Q4, the transistor Q4 outputs the image signal as it is received during the time when the transistor Q5 is turned off, and outputs the image signal level (the shaded portion of FIG. 7E) which is decreased by a predetermined magnitude during the time when the transistor Q5 is turned on. Thus, the level of the image signal is decreased by a predetermined magnitude only in the interval where the level of the image signal output from the Y/C processor 3 is lower than the predetermined low-level reference value V1 and does not correspond to a sync interval.

Referring back to FIG. 3, a signal combiner 67 combines the image signal (the FIG. 7C waveform) whose level is adjusted to become brighter in the first level adjuster 47 with the signal (the FIG. 7E waveform) whose level is adjusted to become darker in the second level adjuster 57. The combiner outputs the combined result (the FIG. 7F waveform) via the input/output portion 4. The image signal (the FIG. 7F waveform) output from the input/output portion 4 is displayed on the screen, to thereby enhance picture visibility due to the large difference between the bright and the dark regions of the image signal.

As described above, the present invention provides an image visibility improvement apparatus for level-adjusting a bright image portion to become even brighter and a dark image portion to become even darker to provide a visually clear image to viewers.

While only certain embodiments of the invention have been specifically described herein, it will apparent that numerous modifications may be made thereto without departing from the spirit and scope of the invention.

What is claimed is:

1. An image visibility improvement apparatus comprising:
   comparator means for comparing levels of an input image signal with predetermined individual reference levels and outputting signals corresponding to the results of the comparisons, said comparator means comprising:
   a first level comparator for comparing the level of the input image signal with a first reference level and outputting a first comparison result; and
   a second level comparator for comparing the level of the input image signal with a second reference level and outputting a second comparison result;
   wherein said first reference level corresponds to a bright portion of the image, and said second reference level corresponds to a dark portion of the image, and
   visibility improvement means for enhancing visibility of an image produced by the input image signal by level-adjusting the image signal to brighten a bright portion of the image signal and to darken a dark portion of the image according to the results of said comparator means;
   wherein when the input image signal exceeds the first reference level, the level of the input image signal is increased.

2. The image visibility improvement apparatus according to claim 1, wherein said first level comparator comprises an operational amplifier, wherein the first reference level is input to an inverting port thereof, and the input image signal is input to a non-inverting port thereof, and said operational amplifier outputs the first comparison result.

3. An image visibility improvement apparatus, comprising:
   comparator means for comparing levels of an input image signal with predetermined individual reference levels and outputting signals corresponding to the results of the comparisons said comparator means comprising:
   a first level comparator for comparing the level of the input image signal with a first reference level and outputting a first comparison result; and
   a second level comparator for comparing the level of the input image signal with a second reference level and outputting a second comparison result;
   visibility improvement means for enhancing visibility of an image produced by the input image signal by level-adjusting the image signal to brighten a bright portion of the image signal and to darken a dark portion of the image according to the results of said comparator means;
   wherein said comparator means further comprises a sync detector for generating a control signal for controlling said second level comparator not to perform a level comparison operation with respect to the input image signal and said second reference level during a sync interval of the input image signal.

4. The image visibility improvement apparatus according to claim 3, wherein said sync detector comprises an operational amplifier, wherein a predetermined voltage is input to an inverting port thereof, and the input image signal is input to a non-inverting port thereof, and said operational amplifier generates the control signal when said input image signal has a lower level than said predetermined voltage.

5. An image visibility improvement apparatus,
   comparator means for comparing levels of an input image signal with predetermined individual reference levels and outputting signals corresponding to the results of the comparisons, said comparator means comprising:
   a first level comparator for comparing the level of the input image signal with a first reference level and outputting a first comparison result; and
   a second level comparator for comparing the level of the input image signal with a second reference level and outputting a second comparison result;
   visibility improvement means for enhancing visibility of an image produced by the input image signal by level-adjusting the image signal to brighten a bright portion of the image signal and to darken a dark portion of the image according to the results of said comparator means;
   wherein said comparator means further comprises a sync detector for generating a control signal for controlling said second level comparator not to perform a level comparison operation with respect to the input image signal and said second reference level during a sync interval of the input image signal;
   wherein said sync detector comprises an operational amplifier, wherein a predetermined voltage is input to an inverting port thereof, and the input image signal is input to a non-inverting port thereof, and said operational amplifier generates the control signal when said input image signal has a lower level than said predetermined voltage; and
   wherein said second level comparator comprises:
   a transistor which is turned on during the time when the control signal is applied from said sync detector and is turned off during other times;

a second operational amplifier, wherein the second reference level is input to an inverting port thereof when said transistor is turned off, the image signal is input to a non-inverting port thereof, said second operational amplifier generates a result signal; and an inverter for inverting the result signal of said second operational amplifier to generate said second comparison result.

6. The image visibility apparatus of claim 5, wherein said visibility improvement means comprises:

a first level adjuster for increasing the level of the input image signal according to the first comparison result signal output from said first level comparator;

a second level adjuster for decreasing the level of the input image signal according to the second comparison result output from the inverter of said second level comparator; and a signal combiner for combining the image signal whose level is increased in said first level adjuster with the image signal whose level is decreased in said second level adjuster.

7. The image visibility apparatus of claim 6 wherein said first level adjuster comprises:

a second transistor which is turned on or off according to the first comparison result input to the base of the second transistor from said first level comparator; and a third transistor which receives the input image signal via the base of the third transistor, said third transistor increasing the level of the input image according to the first comparison result signal which has been input to the base of the second transistor during the time when the second transistor is turned on; and wherein said second level adjuster comprises:

a fourth transistor which is turned on or off according to the second comparison result output from the inverter of said second level comparator and input to the base of said fourth transistor; and a fifth transistor which receives the input image signal via the base of the fifth transistor, said fifth transistor decreasing the level of the input image signal according to the second comparison result which has been input to the base of the fourth transistor during the time when the fourth transistor is turned on.

8. An image visibility improvement apparatus comprising:

comparator means for comparing levels of an input image signal with predetermined individual reference levels and outputting signals corresponding to the results of the comparisons, said comparator means comprising:

a first level comparator for comparing the level of the input image signal with a first reference level and outputting a first comparison result; and a second level comparator for comparing the level of the input image signal with a second reference level and outputting a second comparison result;

visibility improvement means for enhancing visibility of an image produced by the input image signal by level-adjusting the image signal to brighten a bright portion of the image signal and to darken a dark portion of the image according to the results of said comparator means;

wherein said visibility improvement means comprises:

a first level adjuster for increasing the level of the input image signal according to the first comparison result signal output from said first level comparator;

a second level adjuster for decreasing the level of the input image signal according to the second comparison result signal output from said second level comparator; and a signal combiner for combining the image signal whose level is increased in said first level adjuster with the image signal whose level is decreased in said second level adjuster;

wherein said first level adjuster comprises:

a first switch which is turned on or off according to the first comparison result signal input to a first terminal of the first switch from said first level comparator; and a second switch which receives the input image signal via a first terminal of the second switch, said second switch increasing the level of the input image signal according to the first comparison result signal which has been input to the first terminal of said first switch during the time when said first switch is turned on.

9. An image visibility improvement apparatus comprising:

comparator means for comparing levels of an input image signal with predetermined individual reference levels and outputting signals corresponding to the results of the comparisons, said comparator means comprising:

a first level comparator for comparing the level of the input image signal with a first reference level and outputting a first comparison result; and a second level comparator for comparing the level of the input image signal with a second reference level and outputting a second comparison result;

visibility improvement means for enhancing visibility of an image produced by the input image signal by level-adjusting the image signal to brighten a bright portion of the image signal and to darken a dark portion of the image according to the results of said comparator means;

wherein said visibility improvement means comprises:

a first level adjuster for increasing the level of the input image signal according to the first comparison result signal output from said first level comparator;

a second level adjuster for decreasing the level of the input image signal according to the second comparison result signal output from said second level comparator; and a signal combiner for combining the image signal whose level is increased in said first level adjuster with the image signal whose level is decreased in said second level adjuster;

wherein said second level adjuster comprises:

a first switch which is turned on or off according to the second comparison result signal input to a first terminal of the first switch from said second level comparator; and a second switch which receives the image signal via a first terminal of the second switch, said second switch decreasing the level of the input image signal according to the second comparison result signal which has been input to the first terminal of said first switch during the time when said first switch is turned on.

10. An image visibility improvement apparatus, comprising:

comparator means for comparing levels of an input image signal with predetermined individual reference levels and outputting signals corresponding to the results of the comparisons said comparator means comprising:

a first level comparator for comparing the level of the input image signal with a first reference level and outputting a first comparison result; and a second level comparator for comparing the level of the input image signal with a second reference level and outputting a second comparison result;

visibility improvement means for enhancing visibility of an image produced by the input image signal by level-adjusting the image signal to brighten a bright portion of the image signal and to darken a dark portion of the image according to the results of said comparator means;

wherein said visibility improvement means comprises:

a first level adjuster for increasing the level of the input image signal according to the first comparison result signal output from said first level comparator; and a second level adjuster for decreasing the level of the input image signal according to the second comparison result signal output from said second level comparator; and wherein said comparator means further comprises a sync detector for generating a control signal for controlling said second level adjuster not to decrease the level of the input image signal during a sync interval of the input image signal.

11. An image visibility apparatus comprising:

comparator means for comparing levels of an input image signal with a first reference level to provide a first Boolean result and a second reference level to provide a second Boolean result, and outputting signals corresponding to the results of the comparisons;

visibility improvement means for enhancing the visibility of an image produced by the input image signal by level-adjusting the image signal to brighten a bright portion of an image signal by raising the level of the input image signal when the input image signal is higher than the first reference level as determined from the first Boolean result.

12. The image visibility improvement apparatus of claim 11, wherein said visibility improvement means level-adjusts the image signal to darken a dark portion of an image signal by lowering the level of the input image signal when the input image signal is lower than the second reference level as determined from the second Boolean result.

13. An image visibility improvement apparatus comprising:

comparator means for comparing levels of an input image signal with predetermined individual reference levels and outputting signals corresponding to the results of the comparisons, said comparator means comprising:

a first level comparator for comparing the level of the input image signal with a first reference level and outputting a first comparison result; and a second level comparator for comparing the level of the input image signal with a second reference level and outputting a second comparison result;

visibility improvement means for enhancing visibility of an image produced by the input image signal by level-adjusting the image signal to brighten a bright portion of the image signal and to darken a dark portion of the image according to the results of said comparator means;

wherein said visibility improvement means comprises:

a first level adjuster for increasing the level of the input image signal according to the first comparison result signal output from said first level comparator;

a second level adjuster for decreasing the level of the input image signal according to the second comparison result signal output from said second level comparator; and a signal combiner for combining the image signal whose level is increased in said first level adjuster with the image signal whose level is decreased in said second level adjuster;

wherein said first reference level corresponds to a high input level and wherein said second reference level corresponds to a low input level.

14. The image visibility improvement apparatus of claim 13, wherein said first level adjuster increases the level of the input image signal when the first comparison result indicates that the input image signal is higher than the first reference level.

15. The image visibility improvement apparatus of claim 14, wherein said second level adjuster decreases the level of the input image signal when the second comparison result indicates that the image signal is lower than the second reference level.

* * * * *